United States Patent
Balus et al.

(10) Patent No.: US 8,045,492 B2
(45) Date of Patent: Oct. 25, 2011

(54) DYNAMIC ESTABLISHMENT OF VIRTUAL CIRCUITS USING MULTI-SEGMENT PSEUDOWIRES

(75) Inventors: Florin Balus, Kanata (CA); Michael Loomis, Greenland, NH (US); Jeffrey Sugimoto, Ottawa (CA)

(73) Assignee: Nortel Networks Limited, Mississauga, Ontario (CA)

( * ) Notice: Subject to any disclaimer, the term of this patent is extended or adjusted under 35 U.S.C. 154(b) by 763 days.

(21) Appl. No.: 11/814,290

(22) PCT Filed: Nov. 14, 2005

(86) PCT No.: PCT/IB2005/003399
§ 371 (c)(1),
(2), (4) Date: Jul. 19, 2007

(87) PCT Pub. No.: WO2006/077462
PCT Pub. Date: Jul. 27, 2006

(65) Prior Publication Data
US 2008/0084891 A1 Apr. 10, 2008

(51) Int. Cl.
*H04B 3/20* (2006.01)
(52) U.S. Cl. .................................. 370/290; 370/392
(58) Field of Classification Search .................. None
See application file for complete search history.

(56) References Cited

U.S. PATENT DOCUMENTS

| 6,697,329 | B1 | 2/2004 | McAllister et al. |
| 7,035,259 | B2 * | 4/2006 | Nomura et al. ............... 370/392 |
| 7,489,695 | B1 * | 2/2009 | Ayyangar ..................... 370/396 |

FOREIGN PATENT DOCUMENTS

| WO | 2004/014000 A1 | 2/2004 |
| WO | 2004/049644 A1 | 6/2004 |

OTHER PUBLICATIONS

International Search Report for PCT/IB2005/003399 mailed Mar. 15, 2006.

* cited by examiner

*Primary Examiner* — Daniel Wu
*Assistant Examiner* — Frederick Ott
(74) *Attorney, Agent, or Firm* — Withrow & Terranova, PLLC

(57) ABSTRACT

The present invention provides a technique for automatically establishing a virtual circuit from one edge device to another through a core network. The virtual circuit may comprise one or more pseudowire segments. These pseudowire segments extend between adjacent edge and core devices within the core network. Pseudowire segments through the core network are automatically stitched together as a setup message is forwarded from a first edge device to a second edge device through the core network. A virtual circuit is established in one direction, and packets are forwarded in an opposite direction. With the present invention, a virtual circuit comprising any number of pseudowire segments, as well as two attachment circuits, may be established in an automatic and efficient manner upon being initiated by the first edge device.

22 Claims, 6 Drawing Sheets

US 8,045,492 B2

DYNAMIC ESTABLISHMENT OF VIRTUAL CIRCUITS USING MULTI-SEGMENT PSEUDOWIRES

FIELD OF THE INVENTION

The present invention relates to packet-based communications, and in particular to dynamically establishing virtual circuits built by concatenating multiple pseudowire segments.

BACKGROUND OF THE INVENTION

Packet-based communication networks rely on numerous routers and switches to effectively forward packets from point to point throughout the network based on routing decisions made. In certain instances, packets associated with a given communication session are forwarded by routing decisions made at each point (connectionless forwarding). In other instances, service providers want to establish virtual circuits or tunnels, which define a particular path through which packets should be forwarded over the network (connection-oriented forwarding). By forcing packets to take a defined path, service providers are better able to control the quality of service provided in association with forwarding packets over the network.

Unfortunately, configuring each of the routing and switching elements within the network to establish the virtual circuit is often manually intensive and cumbersome. Accordingly, there is a need for a dynamic and effective technique for automatically establishing virtual circuits through a network.

SUMMARY OF THE INVENTION

The present invention provides a technique for automatically establishing a virtual circuit from one edge device to another through a core network. The virtual circuit may comprise one or more pseudowire segments. These pseudowire segments extend between adjacent edge and core devices within the core network. In certain instances, a pseudowire segment may directly connect two edge devices. Initially, a first edge device is provisioned with destination information associated with a second edge device. The first edge device will look at the destination information and determine a next hop toward the second edge device. The next hop may be directly to the edge device or to a core device. The first edge device will generate an entry in a cross connect table to facilitate forwarding for the virtual circuit. A cross connect table will associate the pseudowire segment associated with the next hop and a first attachment circuit supported by the first edge device. Accordingly, incoming packets from the pseudowire segment will be forwarded over the attachment circuit. If the next hop is a core device, the core device will also determine the next hop toward the edge device and send a setup message to the next hop. The core device will also associate the pseudowire segments associated with the next hop (subsequent pseudowire segment) and the prior hop (prior pseudowire segment) in the cross connect table, wherein incoming packets from the subsequent pseudowire segment will be forwarded over the prior pseudowire segment.

When a setup message finally reaches the second edge device, the second edge device will recognize that it is the destination for the setup message and will create an association in a cross connect table to associate the pseudowire segment associated with the hop over which the setup message was received and a second attachment circuit, which is supported by the second edge device. Accordingly, incoming packets over the second attachment circuit are forwarded over the pseudowire segment associated with the hop over which the setup message was received. As such, the pseudowire segments through the core network are automatically stitched together as the setup message is forwarded from the first edge device to the second edge device through the core network. A virtual circuit is established in one direction, and packets are forwarded in an opposite direction. With the present invention, a virtual circuit comprising any number of pseudowire segments, as well as multiple attachment circuits, may be established in an automatic and efficient manner upon being initiated by the first edge device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a communication environment according to one embodiment of the present invention.

FIGS. 2A and 2B provide a communication flow illustrating the operation of one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
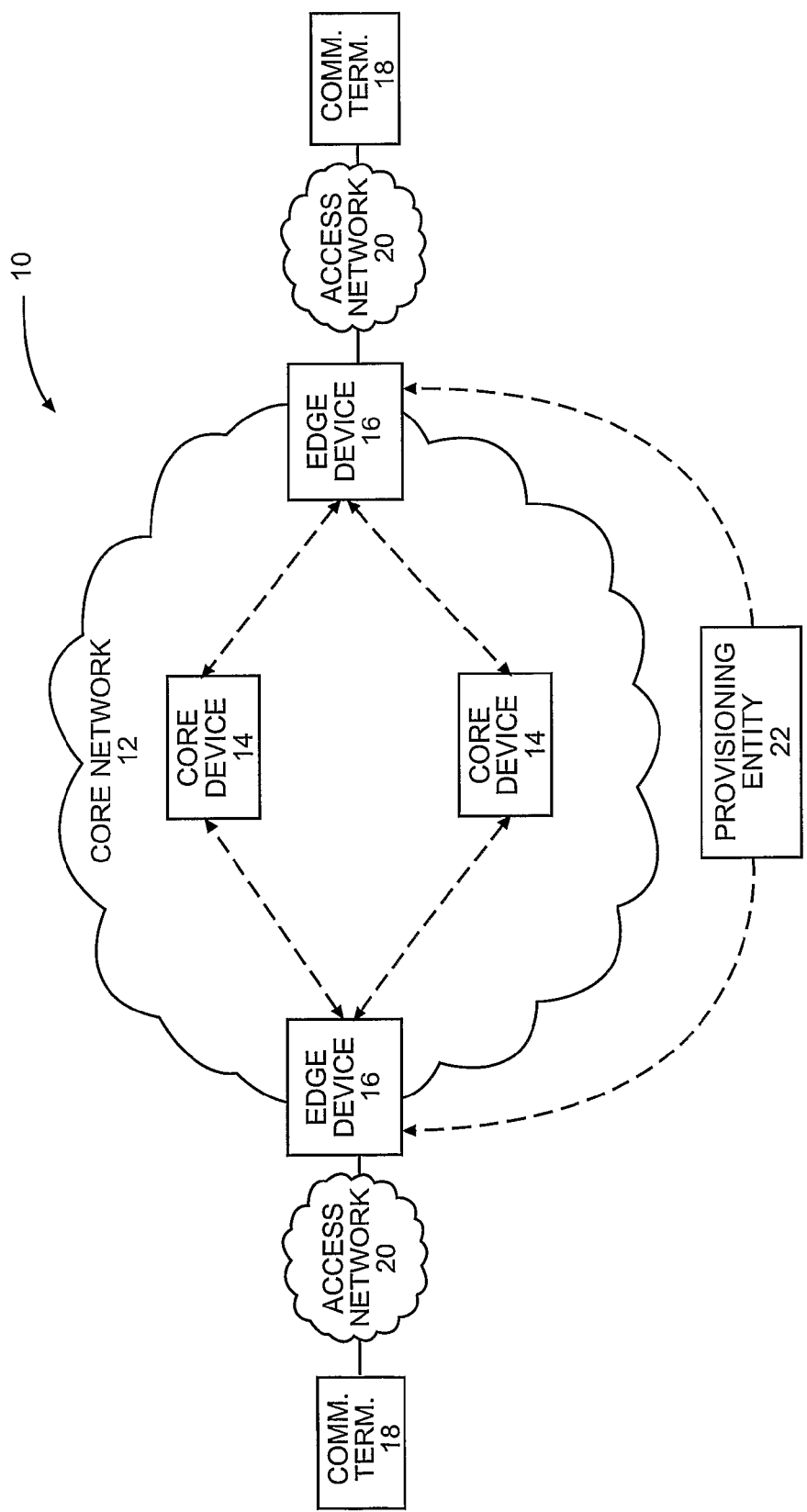

The present invention provides an effective and dynamic mechanism for establishing a virtual circuit, including any number of pseudowire segments, between designated endpoints. A pseudowire segment is a virtual connection between any two devices supporting a portion of the virtual circuit. Prior to delving into the details of the present invention, an overview of an exemplary communication environment 10 in which virtual circuits may be established is illustrated in FIG. 1.

As illustrated, a core network 12 contains any number of core devices 14 that are used to set up the virtual circuit and subsequently forward packets associated with communication sessions between edge devices 16. The edge devices 16 reside at the edge of the core network 12 and are effectively gateways to support communications with various communication terminals 18 via corresponding access networks 20. In addition to forwarding data packets, the core devices 14 and the edge devices 16 are configured to route control messages to facilitate the establishment of pseudowire segments directly between the edge devices 16 (not shown), between an edge device 16 and a core device 14, and between core devices 14. The establishment of a virtual circuit between the edge devices 16 or through the edge devices 16 requires that certain edge devices 16 and core devices 14 associate the appropriate pseudowire segments, such that data packets can be forwarded along the virtual circuit in an appropriate fashion. The data packets may include traditional data, voice, audio, and video information. Further, a given virtual circuit may support one or more communication sessions among any number of users associated with the communication terminals 18.

The virtual circuit may extend from the edge devices 16 through the access network 20 to the appropriate communication terminal 18, which may represent an end user communication terminal such as a personal computer, telephone, or the like, as well as a communication device connecting to an enterprise or other group of potential end users. As such, a virtual circuit may extend from one communication terminal 18 to another through the edge devices 16 in the core network 12, wherein each edge device 16 will receive a data packet from the communication terminal 18 via an appropriate attachment circuit, which may be as well another pseudowire connection or a different type of Layer 2 connection (e.g. Asynchronous Transfer Mode (ATM), Frame Relay, or Ethernet-based) through the access network 20, forward the packet on an appropriate pseudowire segment to an appropriate core device 14, which will again forward the data packet over a pseudowire segment, and the process will continue through the core devices 14 until the data packet reaches the destination edge device 16. The edge device 16 will then forward the packet over an appropriate attachment circuit toward the destination's communication terminal 18 through the connecting access network 20.

For the present invention, each of the two multi-segment pseudowire endpoints located in the edge devices 16 is associated with a globally unique address. For a virtual circuit intended to carry data from right to left with respect to FIG. 1, the signaling to establish the virtual circuit progresses from left to right. In particular, the left edge device 16 will know the destination address for the right edge device 16. Based on the address of the right edge device 16, the left edge device 16 will determine the next hop through the core network 12 to reach the right edge device 16. Accordingly, the left edge device 16 will send a setup message to the core device 14 corresponding to the next hop, as well as establish a cross connect table associating the pseudowire segment leading to the core device 14 with an attachment circuit extending through the access network 20. This association in the cross connect table will allow the left edge device 16 to forward data packets coming in from the pseudowire segment to the corresponding attachment circuit. The core device 14 will provide a similar function by looking at the destination address associated with the right edge device 16, determining the next hop toward the right edge device 16, and establishing an association between the corresponding pseudowire segments and forwarding a setup message to the next hop toward the right edge device 16. The process will continue until the setup message reaches the right edge device 16, which will recognize that the destination address is the address associated with the right edge device 16. The right edge device 16 will associate an attachment circuit through access network 20 with a given pseudowire segment in a cross connect table. Accordingly, data packets flowing from right to left will systematically be forwarded to the appropriate device in traditional fashion.

The invention is particularly beneficial in a multi-protocol label switching (MPLS) environment, wherein the core devices 14 are label switch routers, and the edge devices 16 are label edge routers. The data packets will have labels corresponding to the pseudowire or attachment circuit over which they are being forwarded. The various devices, whether the core devices 14 or the edge devices 16, will use the label to access the cross connect table, and determine the appropriate pseudowire segment over which the data packet should be forwarded. Prior to forwarding, the label will be changed to match the identifier corresponding to the pseudowire segment over which the data packet is to be forwarded. Although the present invention is particularly beneficial in an MPLS environment, those skilled in the art will recognize other communication environments and protocols in which pseudowire segments need to be associated with one another to form a virtual circuit and will benefit from the present invention.

In the above example, a provisioning entity 22 may be configured to provision edge device 16 with sufficient information to identify the other edge device 16 to which a virtual circuit must be established. This provisioning may include a virtual circuit identifier, the destination address for the remote edge device 16, and perhaps an identifier for an attachment circuit that extends through the remote access network 20 and from which the packets will be received by the remote edge device 16 for forwarding along the virtual circuit through the core network 12 to the local edge device 16. To establish a second virtual circuit for data packets flowing in the opposite direction, the remote edge device 16 may be provisioned in a similar fashion.

Figure 2A:
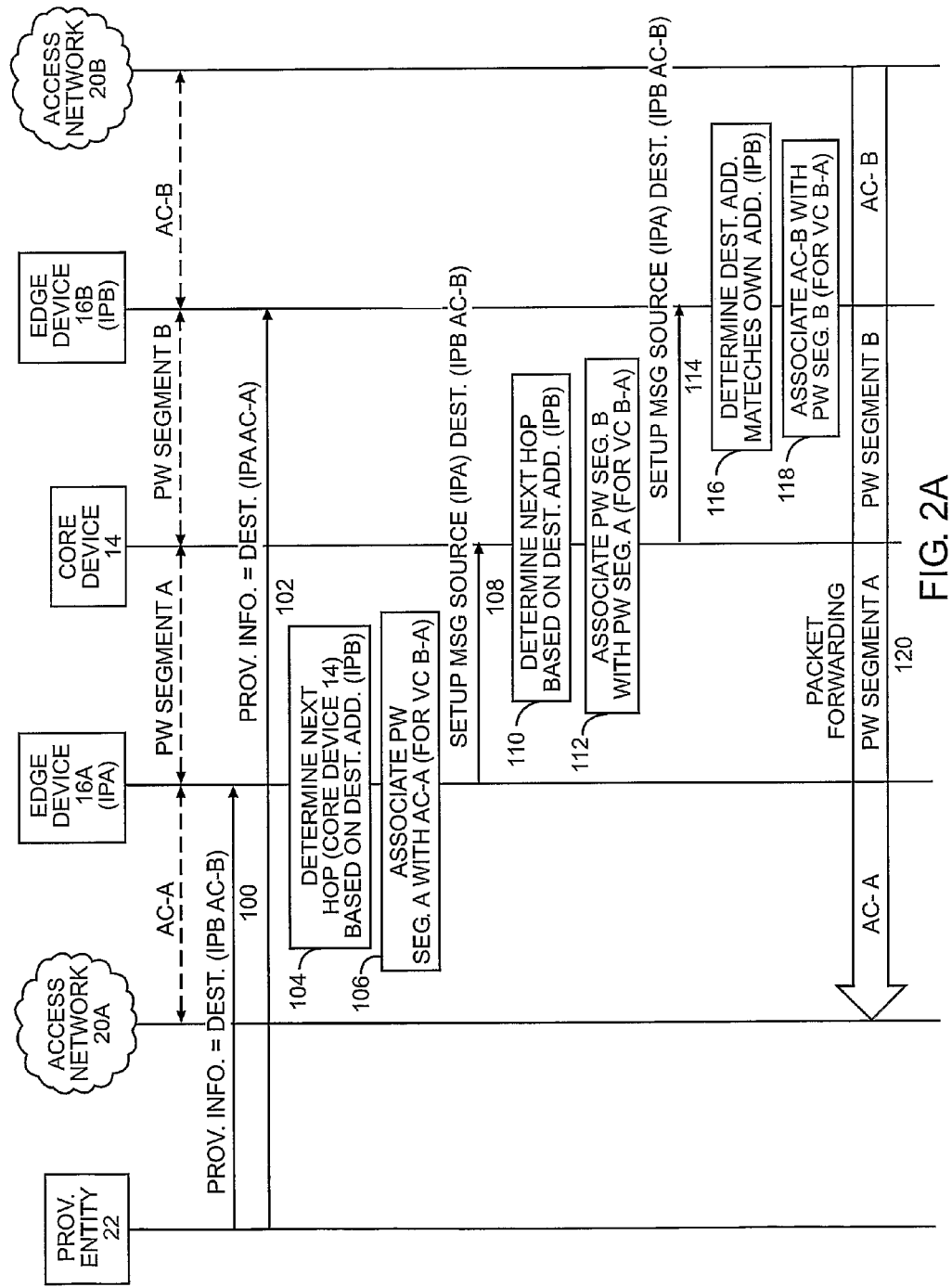
Figure 2B:
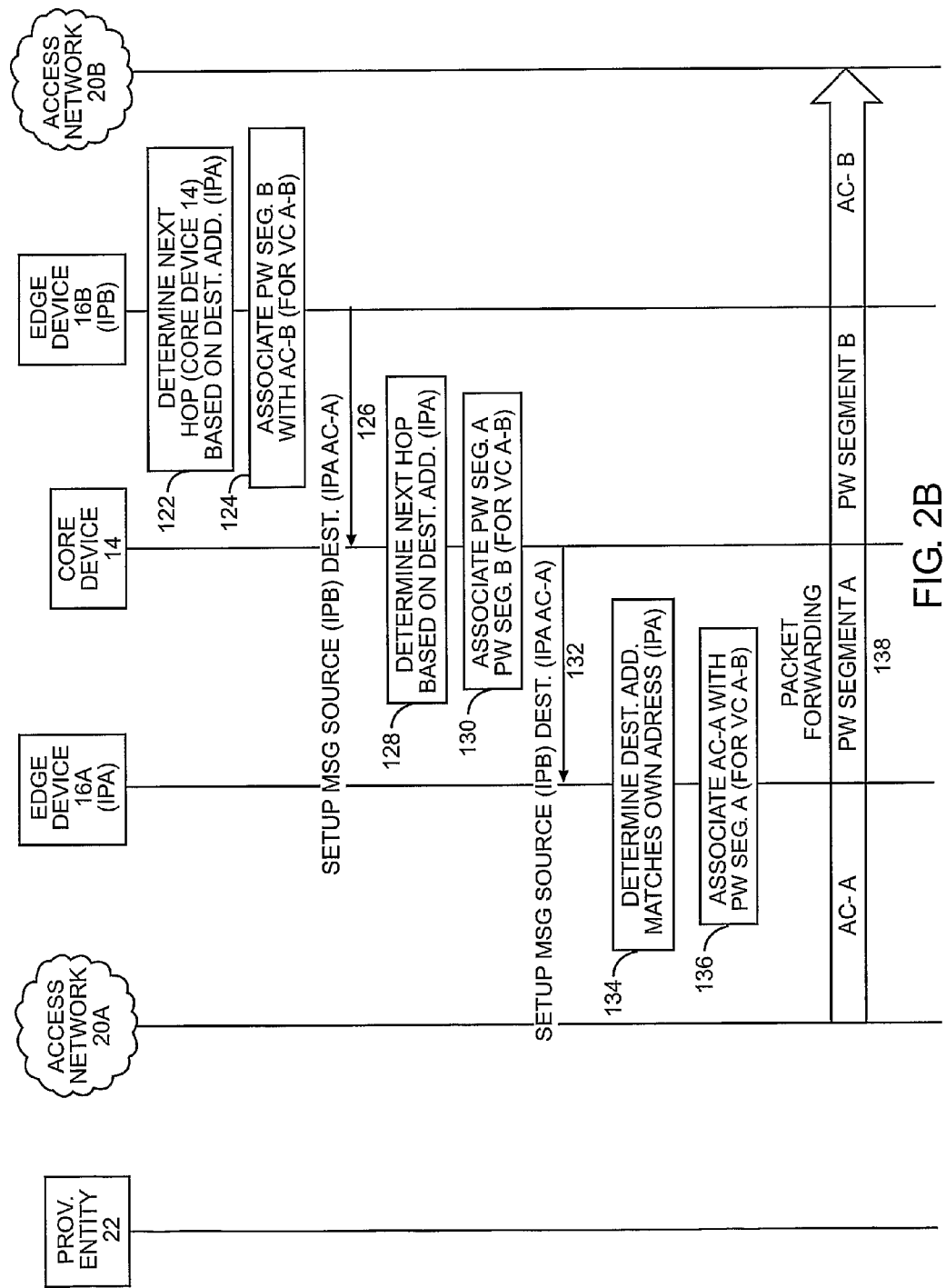

With reference to FIGS. 2A and 2B, a more detailed communication flow is provided for establishing virtual circuits through edge devices 16A and 16B. For the purposes of discussion, a pseudowire (PW) segment A is established between edge device 16A and the core device 14, and a pseudowire segment B is established between the core device 14 and edge device 16B. Further, an attachment circuit AC-A is established through access network 20A from edge device 16A, and an attachment circuit AC-B is established from access network 20B to edge device 16B. Further assume that edge device 16A has an Internet Protocol (IP) address IPA, and edge device 16B has an IP address IPB.

Initially, the provisioning entity 22 can send provisioning information to edge device 16A identifying the destination address IPB for edge device 16B and the attachment circuit AC-B to associate with the virtual circuit to be created (step 100). The virtual circuit is identified as VC B-A, and represents data packets flowing from access network 20B to access network 20A. For the virtual circuit in the reverse direction, virtual circuit VC A-B, the provisioning entity 22 may send provisioning information identifying the destination address IP-A and the corresponding attachment circuit identifier AC-A to edge device 16B (step 102).

Although the signaling for establishing the respective virtual circuits may take place simultaneously or in sequence, the signaling process for each is described separately. For establishment of the virtual circuit VC B-A, edge device 16A will determine the next hop toward edge device 16B by looking at the destination address IPB provided by the provisioning entity 22 in association with virtual circuit VC B-A (step 104). Assume that in the routing tables for edge device 16A, the next hop toward the destination address IPB is to the core device 14. Edge device 16A will then associate pseudowire segment A, which connects to the core device 14, with attachment circuit AC-A (step 106). The association may be stored in a cross connect table, which keeps track of the associations of various pseudowire segments and attachment circuits for any number of virtual circuits. Edge device 16A will then forward a setup message to the core device 14 (step 108). The setup message will include source and destination information, which may include the IP address IPA for edge device 16A as the source address, the destination address of edge device 16B, which is IP address IPB, as well as the identifier of attachment circuit AC-B to use for the virtual circuit VC B-A.

The core device 14 will determine the next hop toward the destination address using IP address IPB for edge device 16B (step 110). The core device 14 will also associate pseudowire segment B with pseudowire segment A in the cross connect table (step 112). The core device 14 will then send a setup message for the PW SEGMENT B to the next hop leading to edge device 16B (step 114). The setup message will include the same source and destination information as the setup message sent from edge device 16A to the core device 14 (in step 108). In this example, the next hop is edge device 16B, which will receive the setup message and determine that the destination address in the setup message matches its own address (step 116). Edge device 16B will then associate the attachment circuit connection AC-B with pseudowire segment B in its cross connect table (step 118). The cross connect tables for edge devices 16A and 16B and the core device 14 represent the forwarding tables, and the associations of the various pseudowire segments and attachment circuits effectively create a virtual circuit over which data packets can be routed.

The virtual circuit is represented by the connection of the various segments shown in step 120. In particular, packets emanating from access network 20B on attachment circuit AC-B are received by edge device 16B, where a label corresponding to pseudowire segment B is attached to the data packet based on the cross connect table information. The data packet is forwarded to the core device 14 via pseudowire segment B. The core device 14 will remove the label for pseudowire segment B, append a label for pseudowire segment A, and forward the packet over pseudowire segment A to edge device 16A based on the cross connect table. Edge device 16A will remove the label for pseudowire segment A, and forward the packet over attachment circuit AC-A based on the cross connect table. The data packets arriving on attachment circuit AC-B and forwarded over attachment circuit AC-A are encapsulated and carried using the Layer 2 protocol characteristic for each individual AC. All the protocols supporting pseudowire encapsulation may be used.

For virtual circuit VC A-B, edge device 16B will analyze the destination address for edge device 16A, IP address IPA, and determine the next hop toward the destination address (step 122). The next hop toward the destination address is the core device 14. Edge device 16B will then associate pseudowire segment B, which connects to the core device 14, with attachment circuit AC-B in the cross connect table (step 124). A setup message identifying the source and destination information, which may include the source IP address IPB, the destination address IPA for the edge device 16A, and an identifier for attachment circuit AC-A, is routed to the core device 14 (step 126). Upon receipt of the setup message, the core device 14 will analyze the destination address IPA and determine the next hop toward edge device 16A (step 128). The core device 14 will associate pseudowire segment A with pseudowire segment B in its cross connect table (step 130), and forward a setup message to the next hop (step 132). The next hop in this case is edge device 16A, which will receive the setup message and determine that the destination address in the setup message matches its own address (step 134). Edge device 16A will then associate attachment circuit AC-A with pseudowire segment A in its cross connect table (step 136). At this point, edge device 16A, the core device 14, and edge device 16B have updated their cross connect tables to facilitate data forwarding through attachment circuit AC-A, pseudowire segment A, pseudowire segment B, and attachment circuit AC-B for virtual circuit A-B (step 138). Again, edge devices 16A and 16B as well as the core device 14 may use labels or other identifiers to facilitate forwarding in traditional fashion, once the virtual circuit is dynamically established according to the concepts of the present invention.

Figure 3:
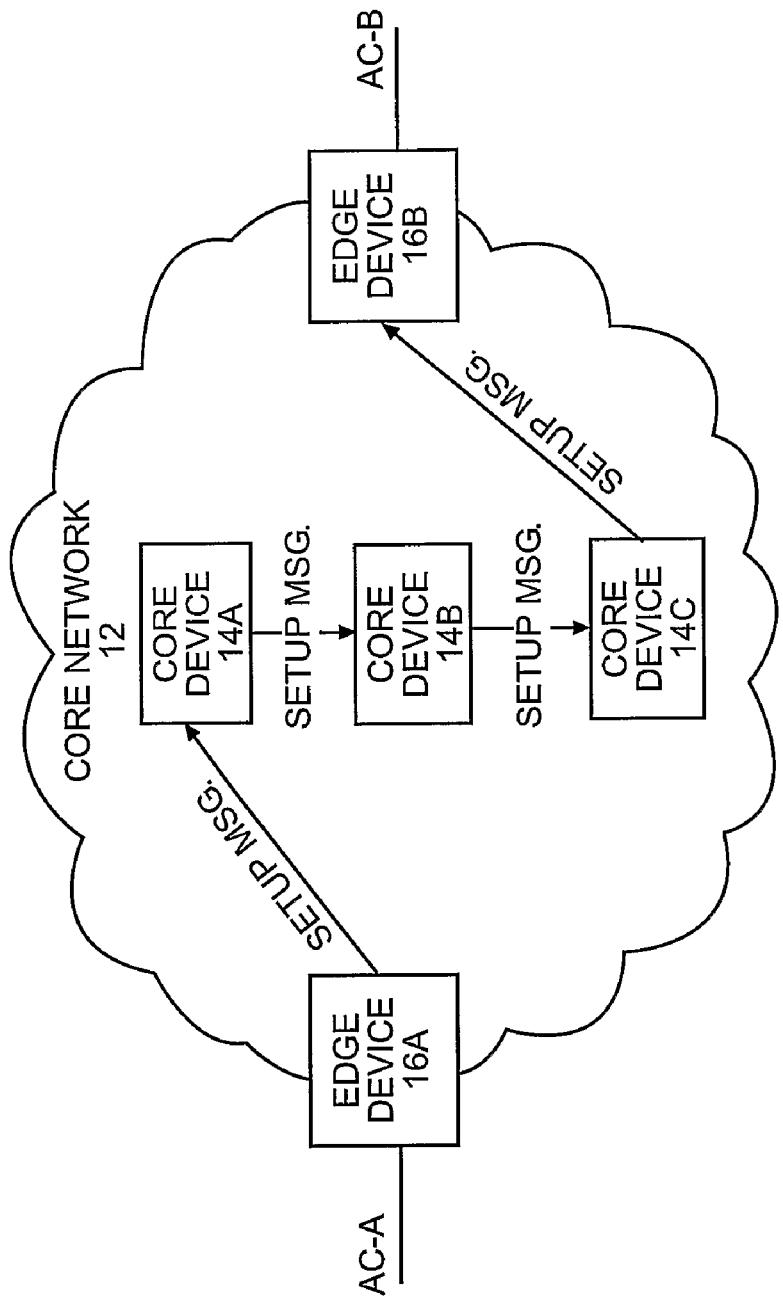
FIG. 3 is a block representation of point-to-point signaling according to one embodiment of the present invention.

As indicated, setup messages can be routed from point to point from edge device 16A to edge device 16B through one or more core devices 14. With reference to FIG. 3, an example is shown where point-to-point routing based on determining the next hop toward the destination address using internal routing tables would lead to a setup message being originated at edge device 16A and being forwarded through core devices 14A, 14B, and 14C, prior to being routed to edge device 16B. In such an embodiment, the next hop routing of setup messages through the core network 12 from one edge device 16 to another is referred to as "point-to-point routing."

Figure 4:
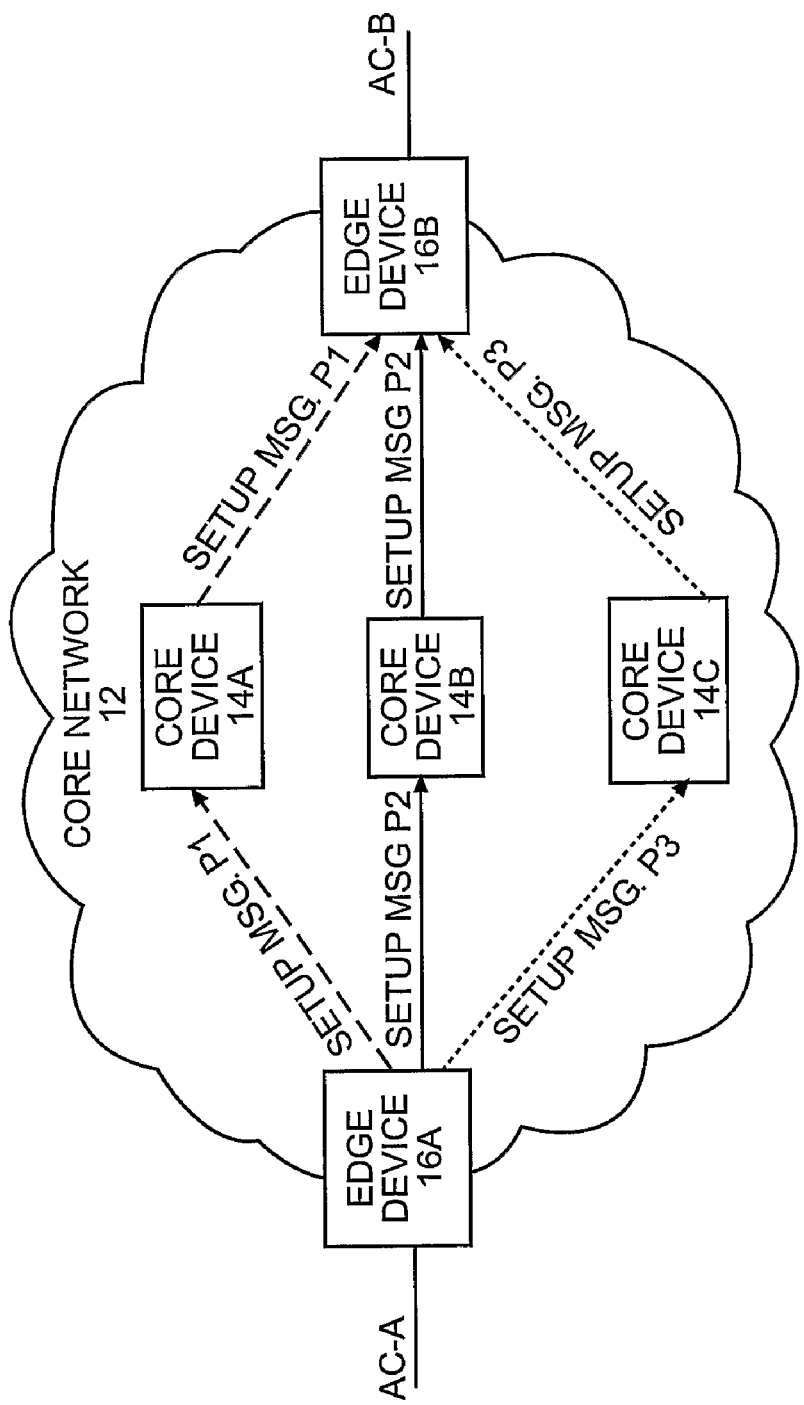
FIG. 4 is a block representation of a flooding mechanism used for signaling according to one embodiment of the present invention.

With reference to FIG. 4, a flooding mechanism may be used wherein edge device 16A may initiate setup messages in different directions and through different paths through the core network 12 to edge device 16B. Based on a knowledge of the architecture of the core network 12, edge device 16B can respond to the various setup messages P1, P2, and P3, by selecting one of the three possible virtual circuits corresponding to the three different setup messages. Edge device 16B can send appropriate messages for the non-selected virtual circuits to effectively break down the corresponding virtual circuit set up by the propagation of those setup messages.

The setup messages may be referred to as label messages, and thus be based on label distribution protocol (LDP) messages in an MPLS environment. These messages may be modified from current standards to include additional fields for storing the source and destination information, which may include the Internet Protocol addresses for the destination and source devices, as well as attachment circuit identifiers and the like. The setup messages may also be modified to include any number of parameters to control an aspect of the virtual circuit or otherwise dictate how data packets are treated when they are being forwarded over the virtual circuit. For example, quality of service parameters and the like may be provided in the setup messages and be used by the various edge devices 16 and core devices 14 to ensure data packets are treated with the appropriate quality of service. Further, any of the edge devices 16 or core devices 14 that cannot comply with these requirements may respond to the setup messages accordingly, wherein the setup message will be routed through a different path in an effort to establish a virtual circuit having the appropriate quality of service. Those skilled in the art will recognize the benefit of the present invention in allowing an edge device 16 to effectively initiate a dynamic process for stitching together the various pseudowire segments and attachment circuits in the cross connect tables of the affected edge devices 16 as well as the intermediate core devices 14 for a given virtual circuit. Again, the direction in which the setup messages flow to stitch together these pseudowire segments and attachment circuits is the reverse of the direction in which data packets will flow along the virtual circuit.

Figure 5:
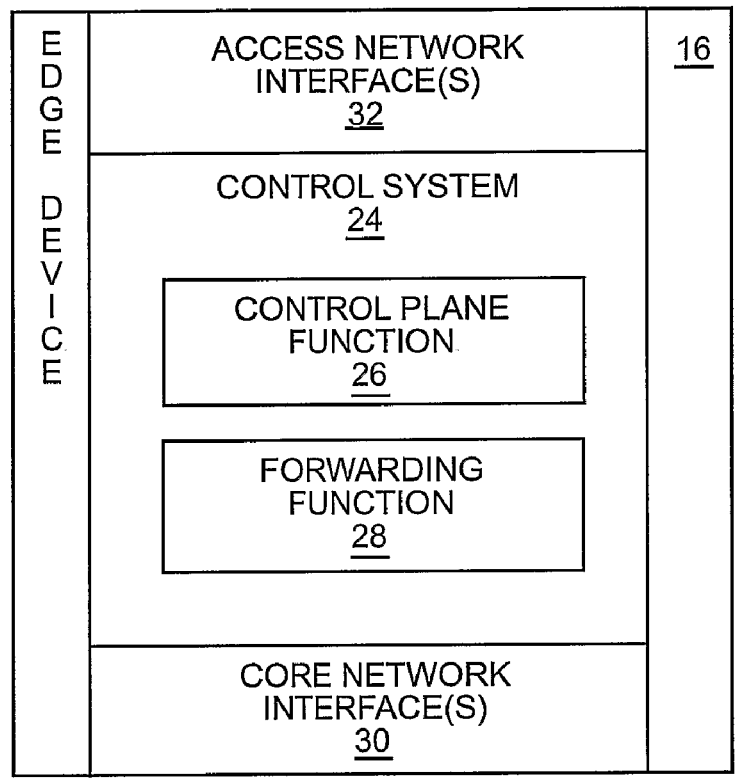
FIG. 5 is a block representation of an edge device according to one embodiment of the present invention.

With reference to FIG. 5, a block representation of an edge device 16 is illustrated. The edge device 16 will include a control system 24 having a control plane function 26 and a forwarding function 28. The control plane function 26 will operate to provide the functionality to effectively establish the virtual circuits by stitching together the pseudowire segments and attachment circuits. The forwarding function 28 will operate in a traditional fashion by forwarding data packets as described above. The control system 24 will also be associated with core network interface(s) 30 to facilitate communications with the core devices 14, and access network interface(s) 32 to facilitate communications via the corresponding access networks 20.

Figure 6:
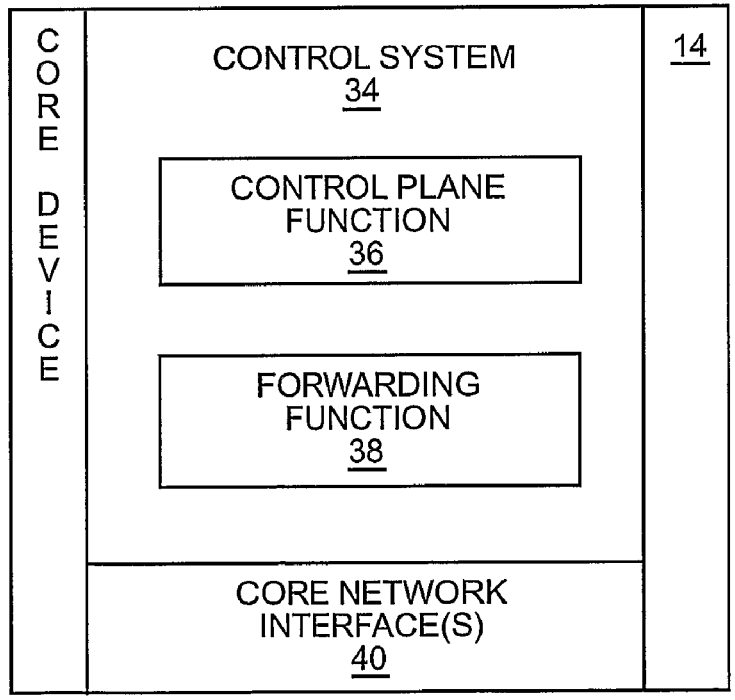
FIG. 6 is a block representation of a core device according to one embodiment of the present invention.

With reference to FIG. 6, a core device 14 is illustrated as having a control system 34 providing a control plane function 36 and a forwarding function 38. The control plane function 36 will operate to establish the virtual circuits as described above, and the forwarding function 38 will operate to forward data packets in traditional fashion. The control system 34 will also be associated with core network interface(s) 40 to facilitate communications with other core devices 14 and the edge devices 16.

Those skilled in the art will recognize improvements and modifications to the preferred embodiments of the present invention. All such improvements and modifications are considered within the scope of the concepts disclosed herein and the claims that follow.

What is claimed is:

1. A network edge device comprising:
    a first communication network interface adapted to support packet communications via attachment circuits;
    a second communication network interface adapted to support packet communications via pseudowire segments in a core network; and
    a control system associated with the first and second communication network interfaces and adapted to:
        receive provisioning information for establishing a virtual circuit with a remote edge device, the provisioning information identifying destination information associated with the remote edge device;
        identify a next hop toward the remote edge device through the core network based on the destination information;
        create a first setup message comprising a source address associated with the network edge device and the destination information; and
        send the first setup message to the next hop to initiate automatic establishment of the virtual circuit; and
    wherein the next hop is associated with a first pseudowire segment between the network edge device and the next hop, the first communication network interface supports a local attachment circuit, and the control system is further adapted to associate the first pseudowire segment with the local attachment circuit such that packets arriving over the first pseudowire segment are forwarded over the local attachment circuit to facilitate part of the virtual circuit.

2. The network edge device of claim 1, wherein the destination information comprises an address for the remote edge device and the next hop is determined by accessing a routing table using the destination information to identify the next hop.

3. The network edge device of claim 2 wherein the destination information further comprises an identifier for a remote attachment circuit supported by the remote edge device.

4. The network edge device of claim 1 wherein the next hop is at least one of the group consisting of the remote edge device and a core device within the core network that is between the remote edge device and the network edge device.

5. The network edge device of claim 1 wherein the first setup message is automatically routed through the core network to the remote edge device and, at each hop within the core network, a pseudowire segment associated with a subsequent hop is associated with a pseudowire segment for a previous hop, such that packets arriving over the pseudowire segment associated with the subsequent hop are forwarded over the pseudowire segment for the previous hop to facilitate part of the virtual circuit.

6. The network edge device of claim 1 wherein the first setup message is automatically routed through the core network to the remote edge device and, at the remote edge device, a remote attachment circuit supported by the remote edge device is associated with a pseudowire segment for a previous hop, such that packets arriving over the remote attachment circuit are forwarded over the pseudowire segment for the previous hop to facilitate part of the virtual circuit.

7. A network edge device comprising:
    a first communication network interface adapted to support packet communications via attachment circuits;
    a second communication network interface adapted to support packet communications via pseudowire segments in a core network; and
    a control system associated with the first and second communication network interfaces and adapted to:
        receive via a hop a first setup message comprising a source address associated with a remote edge device and destination information associated with the network edge device, the first setup message originating from the remote edge device to establish a virtual circuit between the network edge device and the remote edge device;
        determine the first setup message is intended for the network edge device based on the destination information; and
        associate a first pseudowire segment associated with the hop and a local attachment circuit, such that packets arriving over the local attachment circuit are forwarded over the first pseudowire segment to facilitate part of the virtual circuit.

8. The network edge device of claim 7 wherein the destination information comprises an address for the network edge device.

9. The network edge device of claim 7 wherein the destination information further comprises an identifier for the local attachment circuit supported by the remote edge device.

10. The network edge device of claim 7 wherein the hop is at least one of the group consisting of the remote edge device and a core device within the core network that is between the remote edge device and the network edge device.

11. The network edge device of claim 7 wherein the first setup message is automatically routed through the core network from the remote edge device and, at each hop within the core network, a pseudowire segment associated with a subsequent hop is associated with a pseudowire segment for a previous hop, such that packets arriving over the pseudowire segment associated with the subsequent hop are forwarded over the pseudowire segment for the previous hop to facilitate part of the virtual circuit.

12. The network edge device of claim 7 wherein the first setup message is automatically routed through the core network from the remote edge device and, at the remote edge device, a remote attachment circuit supported by the remote edge device is associated with a pseudowire segment for an initial hop, such that packets arriving over the pseudowire segment for the initial hop are forwarded over the remote attachment circuit to facilitate part of the virtual circuit.

13. A core device comprising:
   a communication network interface adapted to support packet communications via pseudowire segments in a core network; and
   a control system associated with the communication network interface and adapted to:
      receive via a prior hop a first setup message comprising a source address associated with an originating edge device and destination information associated with a destination edge device, the first setup message originating from the originating edge device to establish a virtual circuit between the originating edge device and the destination edge device;
      identify a next hop toward the destination edge device based on the destination information;
         send the first setup message over the next hop to facilitate automatic establishment of the virtual circuit; and
         wherein the next hop is associated with a subsequent pseudowire segment and the prior hop is associated with a prior pseudowire segment, and the control system is further adapted to associate the subsequent pseudowire segment with the prior pseudowire segment such that packets arriving over the subsequent pseudowire segment are forwarded over the prior pseudowire segment to facilitate part of the virtual circuit.

14. The core device of claim 13, wherein the destination information comprises an address for the destination edge device and the next hop is determined by accessing a routing table using the destination information to identify the next hop.

15. The core device of claim 14 wherein the destination information further comprises an identifier for a remote attachment circuit supported by the destination edge device.

16. The core device of claim 13 wherein the next hop leads to at least one of the group consisting of the destination edge device and another core device within the core network that is between the core device and the destination edge device.

17. The core device of claim 13 wherein the first setup message is automatically routed through the core network to the destination edge device and, at the destination edge device, an attachment circuit supported by the destination edge device is associated with a pseudowire segment for a previous hop such that packets arriving over the attachment circuit are forwarded over the pseudowire segment for the previous hop to facilitate part of the virtual circuit.

18. The core device of claim 13 wherein the first setup message is automatically routed through the core network from the originating edge device and, at the originating edge device, an attachment circuit supported by the originating edge device is associated with a pseudowire segment for an initial hop, such that packets arriving over the pseudowire segment for the initial hop are forwarded over the attachment circuit to facilitate part of the virtual circuit.

19. A method for dynamically establishing a virtual circuit through a core network between a first edge device and a second edge device comprising:
   provisioning the first edge device with destination information for the second edge device; and
   at the first edge device:
      identifying a next hop toward the second edge device based on the destination information;
      creating a setup message comprising a source address associated with the first edge device and the destination information;
      sending the setup message over the next hop to initiate automatic establishment of the virtual circuit; and
      wherein the next hop is associated with a first pseudowire segment between the first edge device and the next hop, and the first edge device supports a first attachment circuit, the method further comprising:
         at the first edge device, associating the first pseudowire segment with the first attachment circuit such that packets arriving over the first pseudowire segment are forwarded over the first attachment circuit to facilitate part of the virtual circuit.

20. The method of claim 19, further comprising at the second edge device:
   receiving via a prior hop the setup message;
   determining the setup message is intended for the second edge device based on the destination information; and
   associating a pseudowire segment associated with the prior hop and a second attachment circuit such that packets arriving over the second attachment circuit are forwarded over the first pseudowire segment to facilitate part of the virtual circuit.

21. The method of claim 19 further comprising at a core device in the core network:
   receiving via a prior hop the setup message;
   identifying a subsequent hop toward the second edge device based on the destination information; and
   sending the setup message over the subsequent hop to facilitate automatic establishment of the virtual circuit.

22. The method of claim 21 wherein the subsequent hop is associated with a subsequent pseudowire segment and the prior hop is associated with a prior pseudowire segment, the method further comprising associating the subsequent pseudowire segment with the prior pseudowire segment such that packets arriving over the subsequent pseudowire segment are forwarded over the prior pseudowire segment to facilitate part of the virtual circuit.

* * * * *